*INVENTOR.*
HERBERT F. WIEGANDT
BY Ralph R Barnard
HIS ATTORNEY

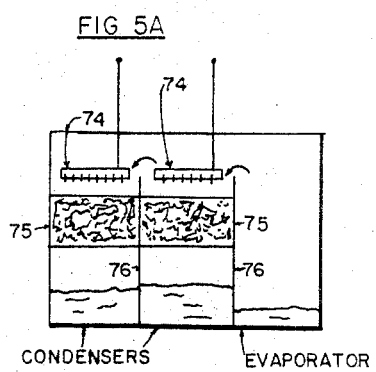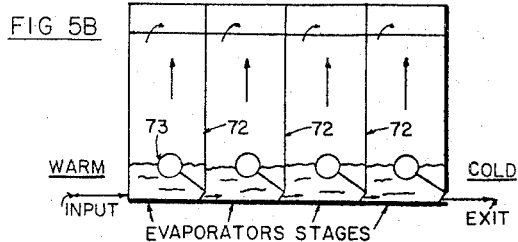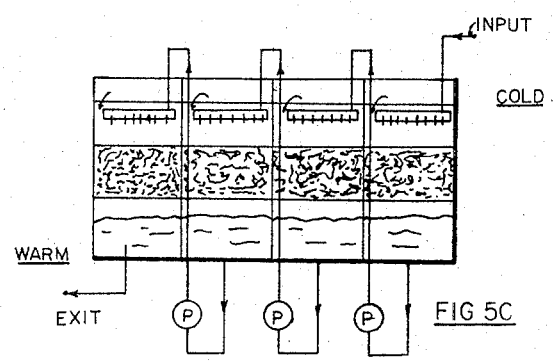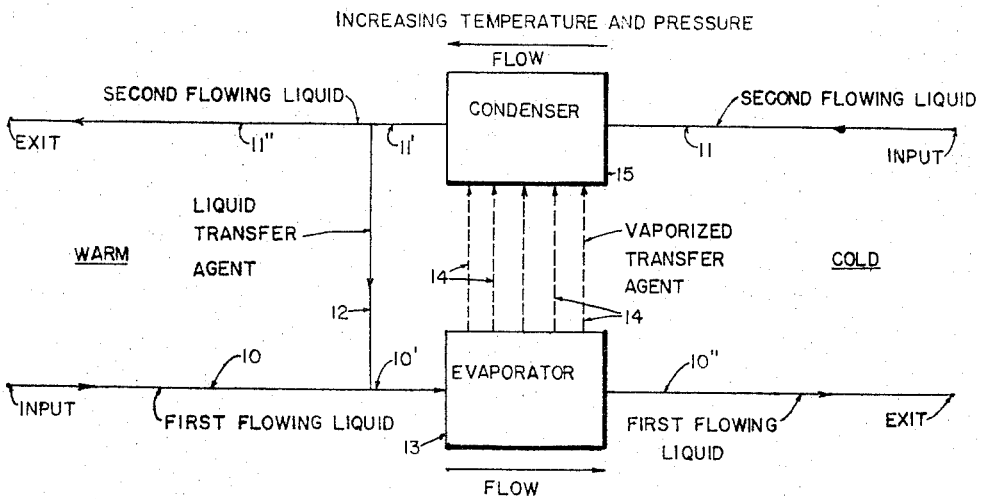

Nov. 12, 1968

H. F. WIEGANDT 3,410,339

DIRECT CONTACT HEAT TRANSFER APPARATUS HAVING
EVAPORATOR AND CONDENSING MEANS

Filed May 18, 1964

INVENTOR.
HERBERT F. WIEGANDT
BY Ralph R. Barnard
HIS ATTORNEY

Nov. 12, 1968  H. F. WIEGANDT  3,410,339
DIRECT CONTACT HEAT TRANSFER APPARATUS HAVING
EVAPORATOR AND CONDENSING MEANS
Filed May 18, 1964  4 Sheets-Sheet 4
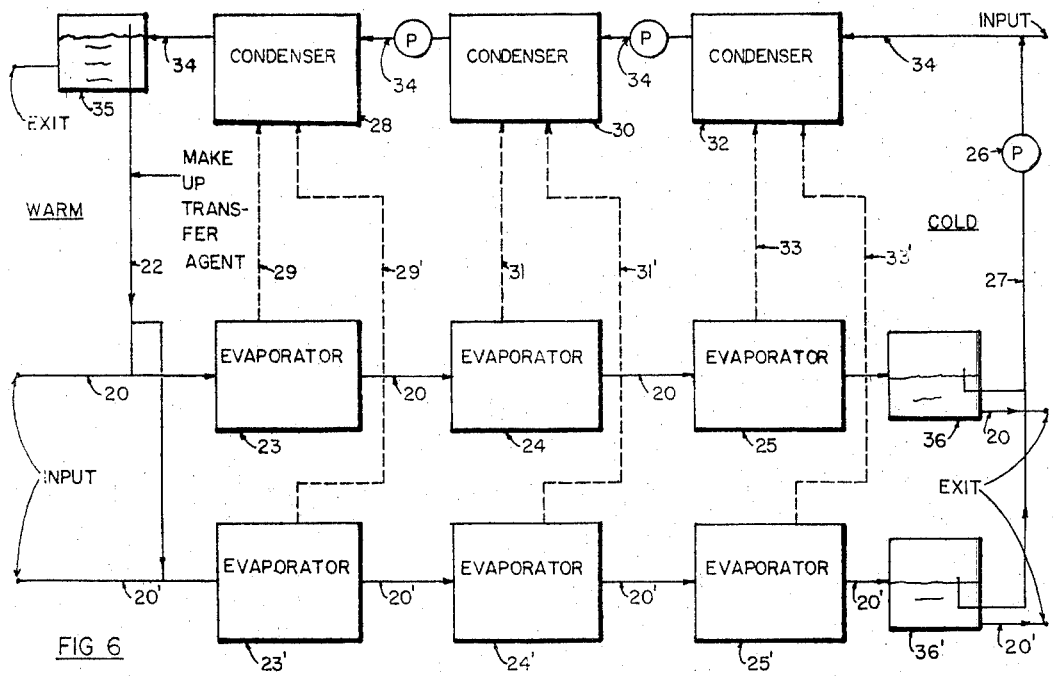
FIG 6
FIG 7
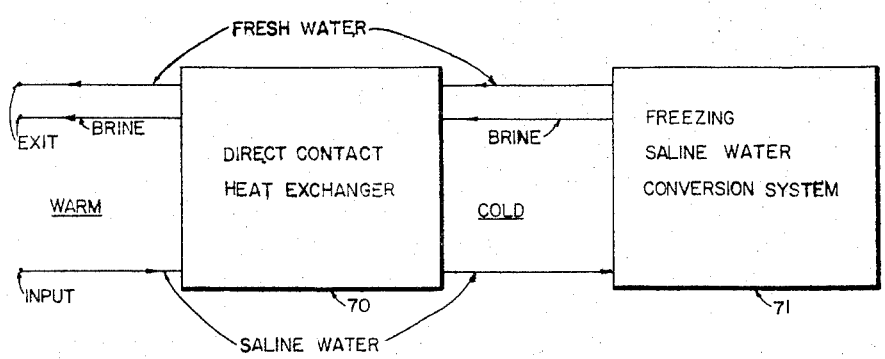
INVENTOR.
HERBERT F. WIEGANDT
BY Ralph R. Barnard
HIS ATTORNEY

United States Patent Office 3,410,339
Patented Nov. 12, 1968

3,410,339
DIRECT CONTACT HEAT TRANSFER APPARATUS HAVING EVAPORATOR AND CONDENSING MEANS
Herbert F. Wiegandt, Ithaca, N.Y., assignor to Cornell Research Foundation, Inc., Ithaca, N.Y., a corporation of New York
Filed May 18, 1964, Ser. No. 368,175
2 Claims. (Cl. 165—105)

ABSTRACT OF THE DISCLOSURE

Apparatus for mixing a water immiscible transfer agent in a first flowing liquid at the high temperature level which is immiscible with respect thereto and which vaporizes without changing its composition when said mixture is subjected to a pressure which is lower than its vapor pressure; transferring the vaporized transfer agent for direct contact with a second flowing liquid by passing both down through a condenser structure containing porous irregular packing so as to enhance intermixing and intimate contact therebetween with a minimum of pressure loss and so that the vaporized transfer agent is condensed to immiscible liquid relationship with the second flowing liquid; separating said liquid transfer agent from the other flowing liquid for return to immiscible relationship with the first flowing liquid; heat energy being removed from the first flowing liquid by the vaporization of the transfer agent and heat energy being added to the other flowing liquid by the condensation of said transfer agent. When the vaporization and condensation of the transfer agent between the two flowing liquids is accomplished in plural stages, the condensing means in each of the plural stages are placed at different elevations so as to eliminate the need for pumps between the condenser stages.

---

This invention relates to the transferring of heat from one flowing liquid to another and more particularly to a process and apparatus for transferring heat from one flowing liquid to another flowing liquid which is at a lower temperature level.

In the prior art the method of transferring heat from a first flowing liquid to at least one other flowing liquid which is at a lower temperature than the first flowing liquid is known as the heat exchange process. The apparatus for performing this function is known as a heat exchanger. The heat exchange process is widely used in industry in all kinds of liquid handling chemical, liquid handling heating and liquid handling refrigeration processes. Typically, in the prior art, the heat exchange or heat transfer operation is accomplished by passing a first flowing liquid at a relatively low temperature in close proximity with a second flowing liquid at a relatively high temperature with the two flowing liquids being separated by a surface of heat conducting material.

Preferably, in order to create an operating environment where there is a maximum rate of heat transfer between the two flowing liquids, the separating surface is made of a high heat-conducting material; the material is selected on the basis of its resistance to corrosion from the flowing liquids; the material forming the separating surface is made as thin as possible; and the separating surface between the liquids is designed to have as large a surface area as possible.

Not surprisingly substantial mechanical problems are associated with designing a heat conducting surface between the two flowing liquids which has as large an area as possible and at the same time is as thin as possible. As a result, many of the design parameters of heat exchanger apparatus represent engineering tradeoffs which are the source of substantial construction costs in addition to space and weight penalties. Most heat transferring separating materials are by their nature subject to corrosion and scaling from the liquid to which heat energy is being added or from which heat energy is being taken. In turn, as corrosion and scale form on the separating surface, that surface becomes more resistant to the conduction of heat energy therethrough. Corrosion resistant, heat transfer material is generally more costly than material which is not and accordingly its use raises the initial cost of heat exchange equipment. Moreover, the corrosion problem often cannot be entirely avoided. To the degree that corrosion is present, it leads to expensive shut downs of the heat exchange equipment for de-scaling and other maintenance.

In practical heat exchange applications, there are numerous occasions where it is desired to transfer heat simultaneously from one flowing liquid to two or more flowing liquids each at a lower temperature level than the first flowing liquid. Similarly, there are applications where it is desired to transfer heat simultaneously from two or more flowing liquids to one flowing liquid at a lower temperature level. There are even other applications where it is desired to transfer heat energy simultaneously from two or more flowing liquids to two or more flowing liquids at a lower temperature level. Following the prior art design precepts described hereinabove it is not practical to provide for the simultaneous transfer of heat from one or more flowing liquids to one or more other flowing liquids because of the inherent complexity of the required equipment. As a practical matter, a particular heat transfer operation must be accomplished with respect to a pair of flowing liquids at one time.

The problems of prior art heat transfer techniques with respect to flowing liquids while of significance in handling low flowing liquid volumes becomes of tremendous economic importance when the volume of handling flowing liquids is large. In view of the above, it becomes apparent that there is a need in the heat transfer field for a heat transfer technique between one flowing liquid and at least one other flowing liquid at a lower temperature which has the following advantages: The heat transfer technique should provide for heat exchanger apparatus of simple design even when handling large volumes of flowing liquids; the heat transfer technique should provide for heat exchanger apparatus of low cost; the heat transfer technique should minimize or eliminate the problems in heat exchanger apparaus design or maintenance with respect to the handling of corrosive flowing liquids; the simultaneous transfer of heat energy between one or more initially warm flowing liquids and one or more initially cold flowing liquids; and finally the heat transfer technique should provide for a high efficiency or maximum heat energy transfer between flowing liquids which are initially at different heat energy levels.

As a potential alternative heat transfer technique, which will satisfy some of these above cited operational criteria, it is also known in the prior art to vaporize a component, in solution, in one flowing liquid by passing it through a reduction of pressure and then condensing that vapor into solution in a second cold flowing liquid so that heat energy is transferred thereto. While such a technique is properly classified as a heat transfer process and is an alternative to the more common heat transfer between liquids through a heat conducting separator, it has very serious operational limitations. Succinctly, those limitations may be categorized as follows:

(1) There are a relatively restricted number of practical applications where the warm first flowing liquid will contain a component in solution for use as a transfer agent which has the proper vaporization pressure and temperature to generate the vapor heat transfer through practical pressure reduction ranges.

(2) The avoidance of limitation (1) by the special addition of a transfer component in solution in the first flowing liquid for the specific purpose of generating vapor for the heat transfer therefrom to a second liquid via condensation involves two distinct problems.

First, the special component in many instances may be unwanted as a functional component of the first and/or second liquids on completion of the heat transfer operation. However, since it is in solution, it cannot be removed economically following the heat transfer operation. In addition, it is emphasized that the heat transfer agent in solution in the cooled first and warmed second flowing liquids after the heat transfer takes place must be recovered in order to be reinserted in solution in the warm first flowing liquid or a source of new transfer agent utilized. The cost of the new transfer agent under the latter alternative may also be uneconomic.

Secondly, since the heat transfer component is in solution the pressure-temperature relationship at which the component begins to vaporize is determined by the total composition of the liquid and not the selected heat transfer component alone. Stated another way, the selection of the heat transfer component on the basis of pressures and temperatures at which it vaporizes or condenses is not independent of the other components of the liquid as to kind and proportions. This problem becomes more complex when the heat transfer is to take place between one or more flowing liquids and one or more flowing liquids at a lower temperature.

It is therefore a primary object of the present invention to provide a new and improved process for transferring heat between one flowing liquid to another flowing liquid which is at a lower temperature level by vaporizing a transfer agent which is not in solution with said flowing liquids.

It is another object of the present invention to provide a new and improved process for transferring heat from a first flowing liquid to another flowing liquid which is at a lower temperature level with a maximum heat transfer between the flowing liquids by vaporizing a transfer agent which is not in solution with said flowing liquids.

It is an additional object of the present invention to provide a new and improved process for transferring heat between one or more flowing liquids to one or more other flowing liquids which are at a lower temperature level which allows for a relatively simple design in the heat exchanger apparatus.

It is another object of the present invention to provide a new and improved process for transferring heat from one or more flowing liquids to one or more other flowing liquids which are at a lower temperature level which is adaptable to large liquid flow rates.

It is still another object of the present invention to provide a new and improved process for transferring heat from one or more flowing liquids to one or more other flowing liquids which are at a lower temperature level where the heat exchanger apparatus is of a relatively low-cost construction.

It is another object of the present invention to provide a new and improved process of transferring heat between one or more flowing liquids to one or more other flowing liquids which are a lower temperature level which eliminates or minimizes the problems in heat exchanger apparatus design or maintenance with respect to the handling of corrosive flowing liquids.

It is an additional object of the present invention to provide a new and improved process for transferring heat which allows for the simultaneous transfer of heat energy between one or more flowing liquids at a relatively high temperature level and one or more flowing liquids at a relatively low temperature level.

Briefly, these objects are accomplished by mixing a water immersible transfer agent in a first flowing liquid at the high temperature level which is immiscible with respect thereto and which vaporizes without changing its composition when said mixture is subjected to a pressure which is lower than its vapor pressure; transferring the vaporized transfer agent for direct contact with a second flowing liquid by passing both down through a condenser structure containing porous irregular packing so as to enhance intermixing and intimate contact there between with a minimum of pressure loss and so that the vaporized transfer agent is condensed to immiscible liquid relationship with the second flowing liquid; separating said liquid transfer agent from the other flowing liquid for return to immiscible relationship with the first flowing liquid; heat energy being removed from the first flowing liquid by the vaporization of the transfer agent and heat energy being added to the other flowing liquid by the condensation of said transfer agent. When the vaporizaton and condensation of the transfer agent between the two flowing liquids is accomplished in plural stages, the condensing means in each of the plural stages are placed a different elevations so as to eliminate the need for pumps between the condenser stages.

Other objects of the present invention will be apparent to those skilled in the art, upon study of the accompanying disclosure and drawings in which:

FIGURE 1 is a simplified block diagram of the heat transfer technique of the teachings of the present invention.

FIGURES 5A, 5B and 5C are a showing of several views of one of the many possible simple low cost constructions for the evaporator and condenser apparatus when utilizing the teachings of the present invention.

Figure 2:
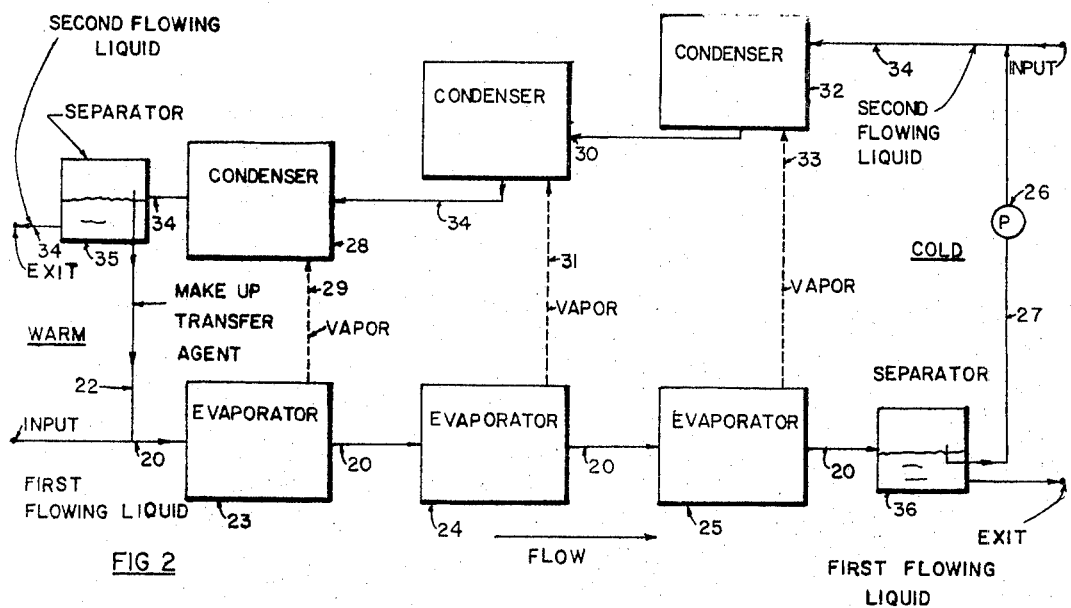
FIGURE 2 is a block diagram showing of apparatus embodying the teachings of the present invention which includes one flowing liquid at a high temperature level and a second flowing liquid in a countercurrent direction at a low temperature level wherein the heat transfer takes place in three stages.

FIGURE 6 shows in block diagram form a variation of the teachings of the present invention illustrating that the heat transfer may take place between two flowing liquids at a relatively high temperature with respect to a single flowing liquid at a relatively low temperature; and FIGURE 7 illustrates in block diagram form how the heat transfer techniques of the present invention may be utilized in a generalized liquid processing system such as saline water conversion which inherently has a flowing liquid input at a relatively high temperature in combination with two flowing liquid outputs at a relatively low temperature.

The heat transferring process between one flowing liquid to another flowing liquid in accordance with the teachings of the present invention is shown in simplified form in FIGURE 1. Therein a warm first flowing liquid is applied to the input point of conduit 10. The first flowing liquid is mixed with a liquid transfer agent from conduit 12 which is immiscible with respect thereto and is passed via conduit 10' through an evaporator 13. In evaporator 13 the mixture is subjected to a reduction of pressure. Since the transfer agent has been especially selected so that it will vaporize at the reduced pressure level and at the temperature level of the mixture entering the evaporator, the transfer agent commences to vaporize out the flowing mixture. Following well known thermodynamic theory, heat energy is accordingly extracted from the first flowing liquid as determined by the latent heat of vaporization of the transfer agent and thereby driving the temperature level of the first flowing liquid down as it passes through the evaporator. As a result, the first flowing liquid in conduit 10" at the exit point has been reduced in temperature.

At the same time, the vapor formed in the evaporator 13 is available for passage through vapor conduit represented by dotted lines 14 to condenser 15 which has passing therethrough a relatively cold flowing liquid, via conduit 11 from an input point. Because of the constant inflow of relatively warm first and relatively cold second liquids, there will always be temperature differentials and thus the related pressure differential causes the aforementioned vaporized transfer agent to flow from the evaporator 13 to the condenser 15, via vapor conduit 14.

When the vaporized transfer agent reaches the condenser 15, the cold second flowing liquid causes it to condense and go into immiscible mixture liquid relationship therewith. Following well known thermodynamic theory, heat energy is delivered by the condensation vapor to the second flowing liquid thereby raising the temperature level of the second flowing liquid as it passes through the condenser 15. The immiscible liquid mixture of transfer agent and second flowing liquid then passes from the condenser to conduit 11" where the transfer agent is separated out, by conventional means, not shown, so that it flows through conduit 12 for return to immiscible relationship with the first flowing liquid in conduit 10'. Meanwhile, the warmed second flowing liquid passes on through conduit 11" to the exit point.

As the warm first flowing liquid including the liquid transfer agent immiscible relationship therewith passes through evaporator 13 in the direction of the exit point, it will be subjected to a decrease of pressure as well as decease of temperature. That pressure decrease aids in maintaining the flow of the liquid. On the other hand, the cold second flowing liquid passing through conduit 11 through condenser 15 is subjected to an increase of pressure as well as the aforementioned increase of temperature. Accordingly, additional means not shown may be required to maintain the flow of the second flowing liquid onto the exit point of conduit 11'.

The selection of the transfer agent to practice the teachings of the present invention is determined by a number of considerations. They are:

(1) The transfer agent when it is in its liquid state must be immiscible with both the first flowing liquid and the second flowing liquid. As used this term means that the transfer agent has zero or very low solubility in either the first or the second flowing liquids at any of the operating temperatures.

(2) The transfer agent must be selected on the basis of the pressure and temperature ranges under which it maintains itself in a liquid state and the pressure and temperature ranges under which it vaporizes or maintains itself in a vaporized state while the first and second flowing liquids in direct contact therewith remain in a liquid state. It is desirable that the condensing second flowing liquid condense the maximum amount of vaporized transfer agent. Any liquid transfer agent which is not vaporized in the evaporator 13 is clearly not performing its function. Although, excess liquid transfer agent may be desirable, the excess which does not vaporize in evaporator 13 is clearly not performing the function of transferring heat energy. Moreover, the existence of transfer agent in liquid form passing through the evaporator without vaporizing should normally be separated from the first flowing liquid and returned to the system in order that the operating loss of transfer agent be minimized.

(3) The transfer agent should be of relatively low cost.

When the first and second flowing liquids, etc., are solutions containing water, transfer agents which are believed to fall into the category described hereinabove, are such paraffin hydrocarbons as pentane and butane. It should be clear however, that there are numerous other transfer agents which may be selected.

One of the significant features of the process shown in FIGURE 1 is that the transfer agent comes into direct contact with the first flowing liquid and the second flowing liquid between which heat is to be exchanged. Since the transfer agent in liquid form is immiscible with respect to the flowing liquids the separation of transfer agent therefrom can be accomplished on a gravitational principle and the solution of the transfer agent is more independent of the kind and proportion of the flowing liquids. There are no heat transfer separators to become corroded by the corrosive nature of either the first or second flowing liquids. Because of the direct contact relationship of the transfer agent and the first and second flowing liquids, closer temperature approaches can be achieved between those two flowing liquids. Because of the nature of the direct contact heat transfer by the circulating transfer agent, the selected equipment can be of the simplest and the lowest cost design. The direct contact heat exchanging process described as the teachings of the present invention has particular advantage when the flow rates of the first and second flowing liquids (and immiscible transfer agent) are large.

As this description proceeds it will be clear that the heat exchanging process between flowing liquids in accordance with the teachings of the present invention is extremely flexible and is adaptable to a wide range of equipment configurations and system applications.

For purposes of illustrating the breadth and flexibility of a heat transferring process between a first flowing liquid and a second flowing liquid in accordance with the teachings of the present invention, reference should be made to FIGURE 2. Therein, instead of having but one evaporator and one condenser, three stages of evaporator and condenser pairs are shown. Specifically, the warm first flowing liquid passes through an input point into conduit 20 wherein it becomes mixed with returning transfer agent in liquid form prior to its passage through evaporator 23, evaporator 24 and evaporator 25, successively. After the first flowing liquid has passed through the three evaporator stages shown, most of the liquid transfer agent in immiscible relationship therewith will have passed as vapor to the condenser side.

However, because the heat transfer apparatus will be operated with excess transfer agent in order that there be an adequate amount of good liquid–liquid contact even in the last evaporator, conduit 20 at the output of the evaporator 25 will have some transfer agent therein. The purpose of separator 36 is to extract from the first flowing liquid, the remaining transfer agent. By way of example, the separator 36 may be of the gravity type as shown diagrammatically. The liquid transfer agent being less dense than the first flowing liquid will float on top of the first flowing liquid as shown. Accordingly, pump 26 is shown connected to the liquid transfer agent in separator 25 via conduit 27 for the purpose of depositing the unused transfer agent in the second flowing liquid in conduit 34 somewhere near the input point in immiscible relationship therewith. This unused transfer agent is deposited in the second flowing liquid near its input point because of the similar temperature level.

Following the principles of the present invention as described hereinabove with respect to FIGURE 1 each of the evaporators has a conduit passing therefrom to the condenser paired therewith. For example, evaporator 23 is connected to condenser 28 via conduit 29; evaporator 24 is connected to condenser 30 via conduit 31; and evaporator 25 is connected to condenser 32 via conduit 33.

In the same fashion as shown in FIGURE 1, the second flowing liquid passes from an input point in a counterflow direction via a conduit 34 successively through condensers 32, 30 and 28. During each stage heat energy is being extracted from the first flowing liquid in the corresponding evaporator and delivered to the second flowing liquid during the condensation of the transfer agent vapor into immiscible liquid relationship with the second flowing liquid. After the second flowing liquid has passed through the last condenser and is proceeding via conduit 34 toward its output point, it is then necessary to separate therefrom the liquified transfer agent in immiscible relationship therewith. This is accomplished by separator 35 functioning in the same manner as previously described separator 36 wherein the transfer agent which is of lower specific density rises to the upper portion of the separator reservoir. In the meantime, the warmed second flowing liquid passes out to the exit point as shown.

Conduit 22 connected to the output of the separator 35 then returns transfer agent to immiscible liquid relationship with the first flowing liquid. Because as a practical matter some of the transfer agent being utilized in the heat exchanging process in accordance with the teachings of the present invention may be lost from the closed system. Some makeup transfer agent may be accordingly added to conduit 22 to make up for the loss.

While FIGURE 2 shows three stages of evaporator condenser pairs it should be clear that following the teachings of the present invention the process may utilize more than three or less than three depending upon the particular practical embodiment. By means of heat-balance calculations according to conventional engineering practice it is evident that the greater the number of paired evaporator-condenser stages the smaller will be the temperature difference between the flowing liquid streams at the warm end and also at the cold end. However, it is also obvious that the cost of the equipment is greater for more stages. Therefore, dependent on the magnitude of the flows, the unit value of the heat energy, and the investment cost an optimum number of stages will be specified.

As set forth hereinabove, one of the significant features of the teachings of the present invention is that the process may be practiced utilizing equipment which is inherently simple in design. Both the evaporators or the condensers may be of a large variety of designs with each being inherently simple in construction and operation. For purposes of illustration, FIGURE 3 shows one simple construction of an upright type of evaporator and condenser which may be used to practice the heat exchange process in accordance with the present invention.

Figure 3:
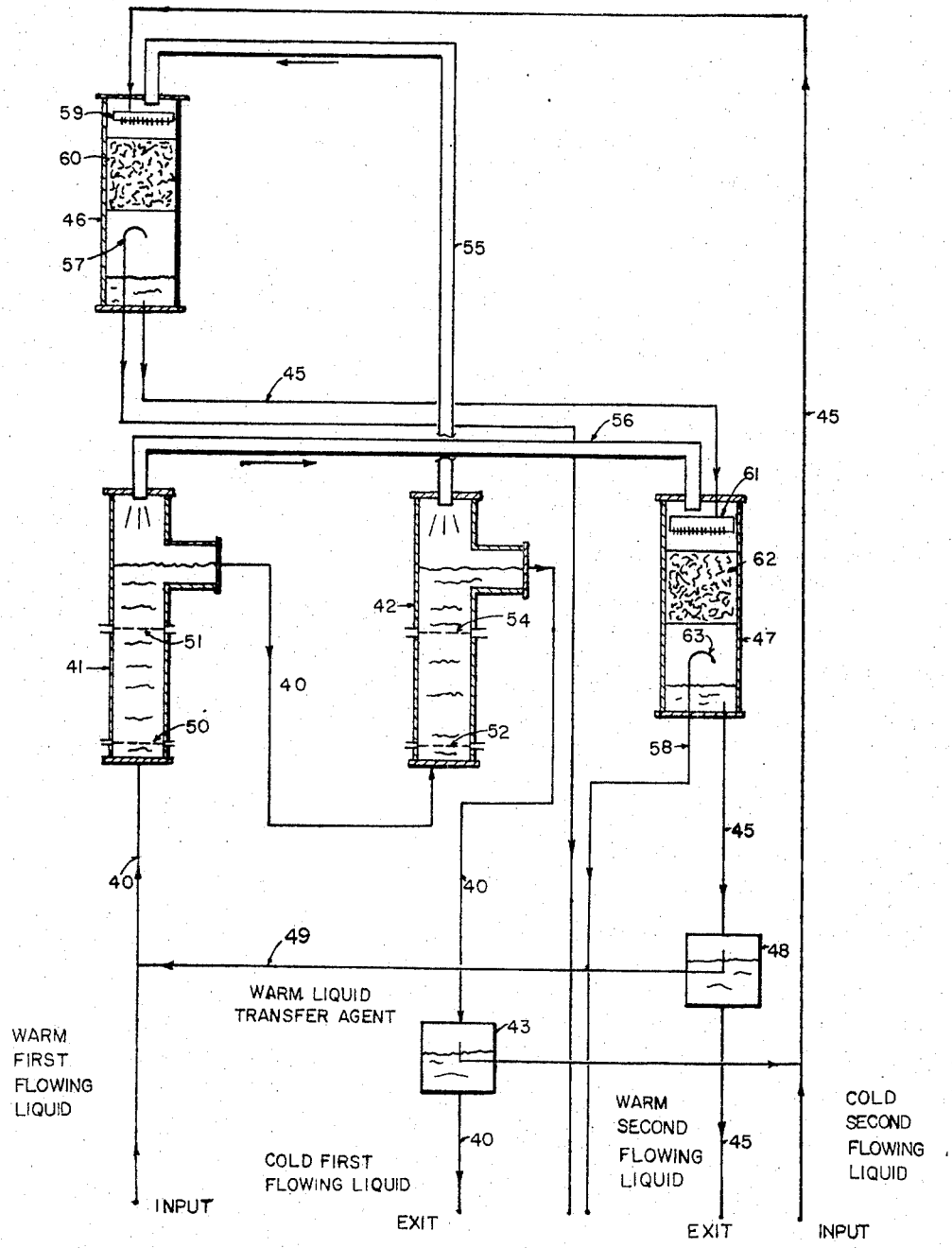
FIGURE 3 is a showing of a two stage embodiment of the block diagram of FIGURE 2 wherein some of the details of a type of upright evaporators and condensers are shown which may be used in practicing the teachings of the present invention.

FIGURE 3 is practically identical with FIGURE 2 except that some of the details of a specific type of evaporator and condenser are shown and only two stages of evaporator-condenser pairs are utilized. Specifically, the warm first flowing liquid flows through conduit 40 from an input in a manner such that it passes through the upright evaporators 41 and 42 successfully before passing through separator 43 on the way to the exit point as cold second flowing liquid. Similarly, the cold second liquid passes through conduit 45 from an input point in a manner such that it successively flows through condenser 46 and condenser 47. Following passage the two condensers the cold second flowing liquid is then passed through separator 48 so that the warm liquid transfer agent in immiscible relationship therewith may be returned via conduit 49 to immiscible relationship with the initially warm first flowing liquid in conduit 40.

Because of the counter-current flow requirement for the first and second flowing liquids, evaporator 41 is paired with the condenser 47 and evaporator 42 is paired with condenser 46. Transfer agent vapor generated in evaporator 41 is conveyed by conduit 56 to condenser 47 and transfer agent vapor derived in evaporator 42 is conveyed to condenser 46 via conduit 55, as shown. Condenser 46 is shown physically raised above condenser 47 in the same manner as the condensers were physically spaced to provide a pressure head in FIGURE 2. As will be recalled from FIGURE 2, the second flowing liquid is required to flow against an increasing pressure and temperature as it flows through the condenser side of the apparatus in counterflow relationship with the first flowing liquid.

As shown, the evaporators are of extremely simple construction. The immiscible liquid transfer agent and first flowing liquid pass into the evaporator via conduit 40 at its lower end. After entry into the evaporator, the flowing mixture passes first through sieve plate 50 and then through sieve plate 51. The purpose of these sieve plates is to inter-mix the transfer agent with the first flowing liquid. As the mixture moves upward toward the liquid surface, the pressure on the mixture is reduced and the transfer agent is no longer stable as a liquid. Transfer agent vapor bubbles form, which rise toward the top of the evaporator envelope and the vaporization functions to extract heat from the first flowing liquid and the remaining transfer agent in immiscible relationship therewith. As the immiscible mixture rises toward the liquid surface within the evaporator envelope, the pressure of the mixture decreases and the temperature of the liquid mixture decreases. The vapor formed passes via conduit 56 to condenser 47.

The remaining liquid mixture of the transfer agent and first flowing liquid is then passed from the evaporator side-lobe via conduit 40 to the input point of evaporator 42. Evaporator 42 operates in exactly the same manner as evaporator 41 except that the pressure drop and the temperature drop of the fluid mixture is over a different and lower range. The vapor formed in the upper envelope of evaporator 42 is transferred to condenser 46 via conduit 55.

In order for there to be an effective vapor condensation operation within condenser 46, the second flowing liquid is applied therein through a distributor plate 59 which sprays the first flowing liquid over the total cross sectional area of the condenser. In this manner, the transfer agent vapor can have more intimate contact with the second flowing liquid. In order to assure this better contact, the mixture of transfer agent and flowing liquid is passed down through a packing 60 which has as its main requirement that of being exceedingly porous and irregular. The fact that the vaporized transfer agent passes through the condenser (packing 60) in the same direction (co-current) with the second flowing liquid is significant in that pressure loss in the movement of the vapor from the evaporator to and through the condenser is minimized so as to maximize the temperature of the mixture. As the transfer agent and second flowing liquid pass down through the filter bed 60 the initially cold second flowing liquid causes the vapor to condense thereby heating the second flowing liquid and returning the transfer agent to immiscible liquid relationship.

As the immiscible liquid mixture forms in the condenser, it collects at the bottom of the condenser envelope and is passed via conduit 45 into condenser 47. As it passes into condenser 47 it goes through a distribution plate 61 which functions to spray the liquid mixture of transfer agent and second flowing liquid over the cross section of the condenser. Accordingly, the mixture comes into intimate contact with the transfer agent vapor being supplied the condenser via conduit 56. Porous packing 62 enhances this inter-mixing and intimate contact. As in condenser 46, the temperature of the second flowing liquid is such that the transfer agent vapor condenses returning additional transfer agent to immiscible liquid relationship. As a result, the temperature of the second flowing liquid mixtured is raised. The resultant immiscible mixture of liquid transfer agent and second flowing liquid in a warm condition will collect in the bottom of the evaporator 47 where it is passed on through conduit 45 to separator 48. The warm liquid transfer agent is separated and the warm second flowing liquid is passed on to the exit point, as shown.

Some vapors of substances other than the transfer agent will eventually accumulate in condensers 46 and 47 and condensation will not be complete. One source of such a substance is air which enters the system as a gas dissolved in the flowing liquid. Bleed lines 57 in condenser 46, and 58 in condenser 47 are for the purpose of bleeding off this non-condensable vapor.

The sieve plates 50, 51 and 52 and 54 of the evaporators are shown as plates with holes drilled therein. However, any equivalent means could be used to perform the same function. The distribtuor plates 59 and 61 of condensers 46 and 47 respectively may be holes in a pipe, or any equivalent means for generating sprinkling action. The nature of packing 60 and 62 in the two condensers can vary over a wide range. One example is to use Intalox saddles which form a highly porous packing.

Figure 4:
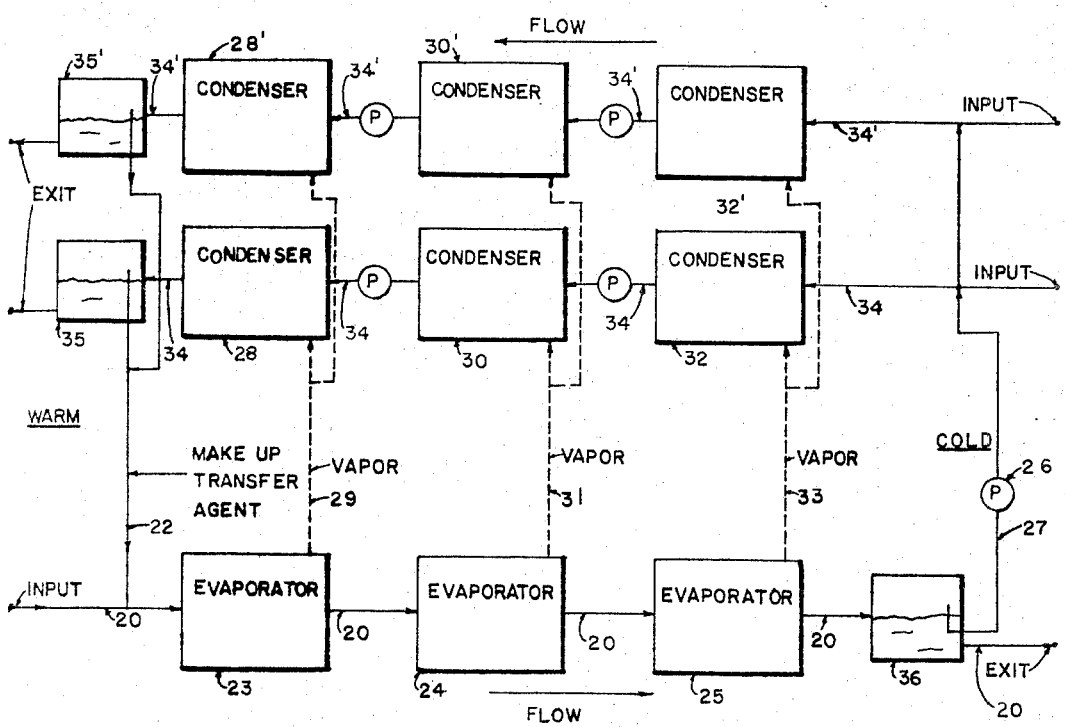
FIGURE 4 is a block diagram showing a modification of FIGURE 2 wherein the condenser side is not physically staggered for gravity flow purposes and the heat transfer is taking place between one flowing liquid at a relatively high temperature and two flowing liquids at a relatively low temperature.

One of the more important features of the heat transferring process of the present invention is the simplicity in the way it may be applied to handling a complex heat exchange problem. For example, there are many occasions in liquid handling systems where it is desired to simultaneously transfer heat from a first initially warm flowing liquid to two initially cold flowing liquids. FIGURE 4 represents the modification of FIGURE 2 showing the adaption of the teachings of the present invention to this operating environment. Identical identification numerals are utilized in FIGURE 4 to identify those components of FIGURE 2 also shown in FIGURE 4. Primed identification numerals are utilized to identify duplicate components in the additional flowing liquid path. For example, the additional initially cold flowing liquid passes from an input through conduit 34' into condenser 32' which is operating in parallel with condenser 32. The additional flowing liquid then passes through condenser 30' which is operating in parallel with condenser 30. The additional flowing liquid then passes through condenser 28' which is operating in parallel with condenser 28. The additional initially cold flowing liquid then passes through separator 35 which is operating in parallel with separator 35 for the purpose of returning the warmed liquid transfer agent back to the initially warm flowing liquid input side (conduit 20) via conduit 22. The additional flowing liquid then passes to an exit point in a warm condition in parallel with the other warmed flowing liquid previously described hereinabove in connection with FIGURE 2.

FIGURE 2 shows the three condenser stages in gravity staggered physical relationship to overcome the pressure increase in the direction of flow through the condensers. FIGURE 4 describes an alternative to physically staggering the condensers by utilizing the pumps shown between the cascaded condensers.

Assuming that the initially cold flowing liquids being passed through conduits 34 and 34' are the same in temperature and volume and the physical dimensions of the condensers 32 and 32', and 30 and 30', and 28 and 28', are identical, then the temperature rise within each of the two initially cold flowing liquids will be the same. However, in the more common case there will be a difference (particularly with respect to temperature and volume of flow) and the heat transfer is automatically self-balancing such that the two originally cold flowing liquids passing through the exit points of conduits 34 and 34' will have received heat energy from the originally warm flowing liquid in relative proportion to their initial relative heat energy levels with reference to the heat energy level of the initially warm flowing liquid in conduit 20. This automatic self-balancing of the paralleled condensers is an important feature of heat transfer process of the teachings of the present invention.

To illustrate the simplicity of a variation of heat transfer apparatus which may be used to practice the process teachings of the present invention, reference should be made to FIGURES 5A, 5B and 5C. Therein (as in FIGURE 4) two initially cold flowing liquids and one initially warm flowing liquid is assumed. Accordingly, each evaporator must be in parallel operation with two condensers within each heat transfer stage. FIGURE 5A shows diagrammatically a cross-section of such a single stage. FIG. 5B shows diagrammatically one side view disclosing four stages of evaporators. FIGURE 5C shows diagrammatically the remote side view disclosing four stages of condensers. Four stages are shown instead of three to emphasize that the number of stages will vary from one practical application to another.

Instead of the evaporators being separate structures, as shown in FIGURE 3, the four evaporator stages of FIGURE 5B appear as part of one tank-like structure with ceiling-high partitions 72 dividing it into four subparts. The initially warm flowing liquid plus immiscible transfer agent flows from evaporator subpart to adjacent evaporator subpart as shown with the float operated door 73 establishing the size of the aperture or weir in each partition based on the level of immiscible fluid mixture in each evaporator stage. Referring to FIGURE 5A, as part of the immiscible transfer agent vaporizes in each evaporator stage, the vapor passes over the top of two low partitions 75 to two portions of the subpart of the tank each acting as a condenser. Each condenser receives as an input one of the two initially cold flowing liquids via the distributor plate 74 shown associated therewith. Each condenser contains a packing 75 for the purpose of bringing the transfer agent vapor into intimate condensing contact with the initially cold flowing liquid passing therethrough. The immiscible mixture of flowing liquid and the condensed transfer agent collect at the bottom of each condenser portion to be pumped on to the next stage.

FIGURE 5C shows diagrammatically the serial connection of the condenser stages via pumps for handling one of the initially cold flowing liquids as would be seen from a side view of the tank. It is emphasized that FIGURES 5A, 5B, and 5C are merely illustrative of many alternative simple consrtuctions of the evaporator condenser stages which may be used in practicing the present inventive process.

While FIGURES 4 and 5 show one initially warm and two initially cold flowing liquids, with respect to which it is desired to have a heat transfer operation, there are many practical applications where it is desired to have a heat transfer operation between two initially warm flowing liquids and one initially cold flowing liquid. FIGURE 6 shows a modification to FIGURE 2 to illustrate the application of the process of the present invention to the latter condition.

Identical identification numerals are utilized in FIGURE 6 to identify those components of FIGURE 2 also shown in FIGURE 6. Primed identification numerals are utilized to identify duplicate components in the additional flowing liquid path. For example, the additional initially warm flowing liquid passes from an input point through conduit 20' into evaporator 23' which is operating in parallel with evaporator 23. The additional flowing liquid then passes through evaporator 25' which is operating in parallel with evaporator 24. The additional flowing liquid then passes through evaporator 25 which is operating in parallel with evaporator 25'. Finally the additional flowing liquid passes through separator 36' which is operating in parallel with separator 36' for the purpose of delivering the unused cold liquid transfer agent to the initially cold flowing liquid in conduit 34 via conduit 27. The additional flowing liquid then passes to the exit point of conduit 20' in a cold condition in parallel with the other cooled flowing liquid at the exit point of conduit 20 previously described hereinabove in connection with FIGURE 2. Like FIGURE 4, FIGURE 6 shows the alternative to physically staggering the condensers by utilizing the pumps shown between the cascaded condensers.

Assuming that the initially warm flowing liquids being passed through conduits 20 and 20' are the same in temperature and volume and the physical dimensions of the evaporators 23 and 23', 24 and 24', and 25 and 25', are identical, then the temperature decrease within each of the two initially warm flowing liquids will be the same. However, in the more common application there will be a difference (particularly with respect to temperature and volume of flow) and the heat transfer is automatically self-balancing such that the two originally warm flowing liquids passing through the exit points of conduits 20 and 20' will have transferred heat energy to the single initially cold flowing liquid in relative proportion to their initial relative heat energy levels with reference to the heat energy level of the initially cold flowing liquid in conduit 34. The automatic self-balancing of the paralleled evaporators is an important feature of the teachnigs of the present invention.

FIGURE 4 shows the teachings of the heat transferring process of the present invention being applied to the transferring of heat from one initially warm flowing liquid to two initially cold flowing liquids. It should be clear that there may be more than two initially cold flowing liquids and that an additional path of cascaded condensers may be utilized to handle that particular system application in accordance with the teachings of FIGURE 4.

Similarly, FIGURE 6 shows the heat transfer process of the present invention being applied to the transferring of heat between two initially warm flowing liquids and one initially cold flowing liquid. If the particular application involves more than two initially warm flowing liquids, the teachings of the present invention would be applied by adding an additional path of evaporators in accordance with the teachings of FIGURE 6.

Moreover, if the heat transferring process involves more than one initially warm flowing liquid and more than one initially cold flowing liquid the teachings of the present invention would be applied by operating each evaporator in each stage in parallel with each condenser in that stage with the number of condensers and evaporators within each stage being determined by the number of initially cold flowing liquids and the number of initially warm flowing liquids, respectively.

The heat exhanging process in accordance with the teachings of the present invention would appear to have wide use in industry in many kinds of liquid handling chemical, liquid handling heating and liquid handling refrigeration processes involving high volumes of flowing liquids. In one category the teachings of the present invention may be utilized to cool an initially warm input liquid for use in a liquid handling system operating on the cold input liquid so as to produce a cold product liquid and a cold by-product liquid. In such a case the heat exchange process, according to the teachings of the present invention would be between the initially warm input liquid in countercurrent flow relationship with the initially cold product and initially cold by-product flowing liquids. A refrigeration type saline water conversion system is illustrative of such a practical application for the heat transfer process of the present invention.

Reference is made to FIGURE 7. Therein saline water, which in ambient condition is initially warm, is passed through an input point into a direct contact heat exchanger 70 where it is cooled and passed on to a saline water conversion system 71 which operates to convert the saline water to fresh water and brine by passing the saline water through a freezing step in a manner known to those skilled in the art. Patent No. 3,251,193 issued May 17, 1966, entitled, "Concentration System for Saline Water Or the Like," by the same inventor as the present application, describes an example of such a system. The product fresh water in a cold condition and the by-product brine in a cold condition are used within direct contact heat exchanger 70 in countercurrent relationship with the initially warm saline water in a heat transfer operation in accordance with the teachings of the present invention.

In other practical applications the input liquid or liquids in their ambient condition may be relatively cold and the purpose of the heat exchange operation is to warm the ambient input liquid. An example of such an application would be a saline water conversion system which operates on an evaporation technique. Therein the fresh water product and the brine by-product would be initially relatively warm while the saline water input would be relatively cold. Accordingly, the heat transfer operation in accordance with the teachings of the present invention would be between the two initially warm flowing liquids (fresh water product and brine by-product) and one initially cold flowing liquid (saline water input) in countercurrent relationship. FIGURE 6, described hereinabove, illustrates one way of applying the teachings of the present invention to that particular heat transfer application. A person skilled in the art of course will foresee numerous applications where the heat transferring process of the present invention may be applied.

While there have been shown and described and pointed out the fundamental novel features of the invention as applied to the preferred embodiments described, it will be understood that various omissions and substitutions and changes in the form and details of the devices illustrated and in its operation may be made by those skilled in the art, without departing from the spirit of the invention. It is the intention, therefore, to be limited only as indicated by the scope of the following claims.

What is claimed is:

1. Apparatus for transferring heat from an initially warm flowing aqueous liquid to an initially cold flowing aqueous liquid, comprising a source of initially warm flowing aqueous liquid,
a source of initially cold flowing aqueous liquid,
apparatus for mixing a transfer agent within said initially warm flowing liquid which is immiscible with respect thereto and which vaporizes without changing its composition when said mixture is subjected to a pressure lower than its vapor pressure,
evaporator means for subjecting said mixture to said pressure causing said transfer agent to vaporize,
condenser means containing packing therein which is exceedingly porous and irregular,
means connected to said source of initially cold flowing aqueous liquid for passing said initially cold aqueous liquid into the upper part of said condenser and on top of and through said packing to the bottom part of the condenser means,
means for passing said vaporized transfer agent through the upper portion of said condenser means and down through said packing in the same direction and in intimate contact with said initially cold aqueous liquid where said vaporized transfer agent is condensed into liquid relationship with said initially cold flowing liquid,
means for separating said liquid transfer agent from said initially cold flowing liquid,
means for returning said separated liquid transfer agent to immiscible liquid relationship with said initially warm flowing liquid,
heat energy being removed from said initially warm flowing liquid by the vaporization of said transfer agent, and
heat energy being added to said initially cold flowing liquid by the condensation of said transfer agent.

2. The apparatus of claim 1 wherein said condenser means comprises plural condenser units with said initially cold aqueous liquid passing successively therethrough, each of said condenser units being spaced in elevation so as to be below the condenser unit from which it receives the aqueous liquid, said difference in elevation being sufficient to permit the entry in the next lower condenser unit by gravity flow,
each of said condenser units containing a packing which is exceedingly porous and irregular and each adapted to receive said vaporized transfer agent through the upper portion thereof so that said vaporized transfer agent passes through said packing in the same direction as said aqueous liquid.

References Cited

UNITED STATES PATENTS

| | | | |
|---|---|---|---|
| 3,155,610 | 11/1964 | Williams | 62—58 |
| 3,167,401 | 1/1965 | Herman | 62—58 |
| 3,181,600 | 5/1965 | Woodward et al. | 62—58 |
| 3,217,505 | 11/1965 | Tuwiner | 62—58 |
| 3,236,747 | 2/1966 | Margiloff | 203—11 |
| 3,239,459 | 3/1966 | Patterson | 210—21 |
| 585,365 | 6/1897 | Skiffington | 202—185 |
| 3,206,379 | 9/1965 | Hill | 202—185 |
| 3,249,517 | 5/1966 | Lockman | 202—185 |
| 3,305,456 | 2/1967 | Broughton | 203—11 |

WILBUR L. BASCOMB, JR., *Primary Examiner.*